United States Patent
Farooq et al.

(10) Patent No.: US 12,071,094 B2
(45) Date of Patent: Aug. 27, 2024

(54) VEHICLE AIRBAG DEPLOYABLE ALONG FRONT PILLAR AND HINGE PILLAR

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/157,133

(22) Filed: Jan. 20, 2023

(65) Prior Publication Data
US 2024/0246506 A1   Jul. 25, 2024

(51) Int. Cl.
| | |
|---|---|
| *B60R 21/2338* | (2011.01) |
| *B60R 21/16* | (2006.01) |
| *B60R 21/213* | (2011.01) |
| *B60R 21/231* | (2011.01) |
| *B60R 21/232* | (2011.01) |

(52) U.S. Cl.
CPC ........ *B60R 21/2338* (2013.01); *B60R 21/213* (2013.01); *B60R 21/232* (2013.01); *B60R 2021/161* (2013.01); *B60R 2021/23107* (2013.01); *B60R 2021/23386* (2013.01)

(58) Field of Classification Search
CPC ... B60R 21/213; B60R 21/214; B60R 21/232; B60R 21/2338; B60R 2021/161; B60R 2021/23107; B60R 2021/23192; B60R 2021/23386; B60R 2021/23388
See application file for complete search history.

(56) References Cited

U.S. PATENT DOCUMENTS

| | | | | |
|---|---|---|---|---|
| 5,752,713 A | * | 5/1998 | Matsuura | B60R 21/23138 280/730.2 |
| 5,992,877 A | * | 11/1999 | Gray | B60R 21/23 280/743.1 |
| 6,113,132 A | * | 9/2000 | Saslecov | B60R 21/20 280/730.1 |
| 6,135,497 A | * | 10/2000 | Sutherland | B60R 21/08 280/748 |
| 6,431,588 B1 | * | 8/2002 | Bayley | B60R 21/232 280/730.2 |
| 6,722,691 B1 | | 4/2004 | Haland et al. | |
| 7,000,944 B2 | | 2/2006 | Bakhsh et al. | |
| 7,055,852 B2 | * | 6/2006 | Bakhsh | B60R 21/232 280/743.1 |

(Continued)

*Primary Examiner* — Laura Freedman
(74) *Attorney, Agent, or Firm* — Frank A. MacKenzie; Bejin Bieneman PLC

(57) ABSTRACT

A vehicle includes a vehicle roof, a front pillar extending downwardly from the vehicle roof, and a hinge pillar extending downwardly from the front pillar. The vehicle includes a track having a first portion having a first axis elongated along the front pillar and a second portion having a second axis elongated along the hinge pillar. The second axis is transverse to the first axis. The vehicle includes an airbag supported by the vehicle roof and slidably engaged with the track. The airbag is inflatable to an inflated position. The airbag is engaged to the first portion of the track and the second portion of the track in the inflated position.

17 Claims, 8 Drawing Sheets

(56) References Cited

U.S. PATENT DOCUMENTS

| | | | |
|---|---|---|---|
| 7,322,606 B2* | 1/2008 | Yamamura | B60R 21/08 |
| | | | 280/730.2 |
| 9,327,669 B2* | 5/2016 | Jaradi | B60R 21/08 |
| 9,994,182 B1 | 6/2018 | Jaradi et al. | |
| 10,279,770 B2 | 5/2019 | Faruque et al. | |
| 10,336,279 B2* | 7/2019 | Farooq | B60R 21/231 |
| 10,682,972 B2* | 6/2020 | Faruque | B60R 21/08 |
| 11,001,225 B2* | 5/2021 | Kwon | B60R 21/2338 |
| 11,135,992 B2 | 10/2021 | Faruque et al. | |
| 11,148,631 B2 | 10/2021 | Jaradi et al. | |
| 11,325,556 B2* | 5/2022 | Jaradi | B60R 21/233 |
| 11,332,094 B2* | 5/2022 | Farooq | B60R 21/213 |
| 11,623,600 B2* | 4/2023 | Moran | B60R 21/232 |
| | | | 280/729 |
| 11,654,858 B1* | 5/2023 | Wolf | B60R 22/48 |
| | | | 280/730.1 |
| 11,667,257 B2* | 6/2023 | Farooq | B60R 21/23138 |
| | | | 280/730.2 |
| 11,702,029 B1* | 7/2023 | Golman | B60R 21/2338 |
| | | | 280/743.2 |
| 11,745,692 B2* | 9/2023 | Kang | B60R 21/2338 |
| | | | 280/730.2 |

* cited by examiner

VEHICLE AIRBAG DEPLOYABLE ALONG FRONT PILLAR AND HINGE PILLAR

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in passenger compartment of the vehicle. Vehicles may include airbags supported on a dash, side air curtains mounted to roof rails, seat-mounted airbag, etc.

DETAILED DESCRIPTION

Figure 1:
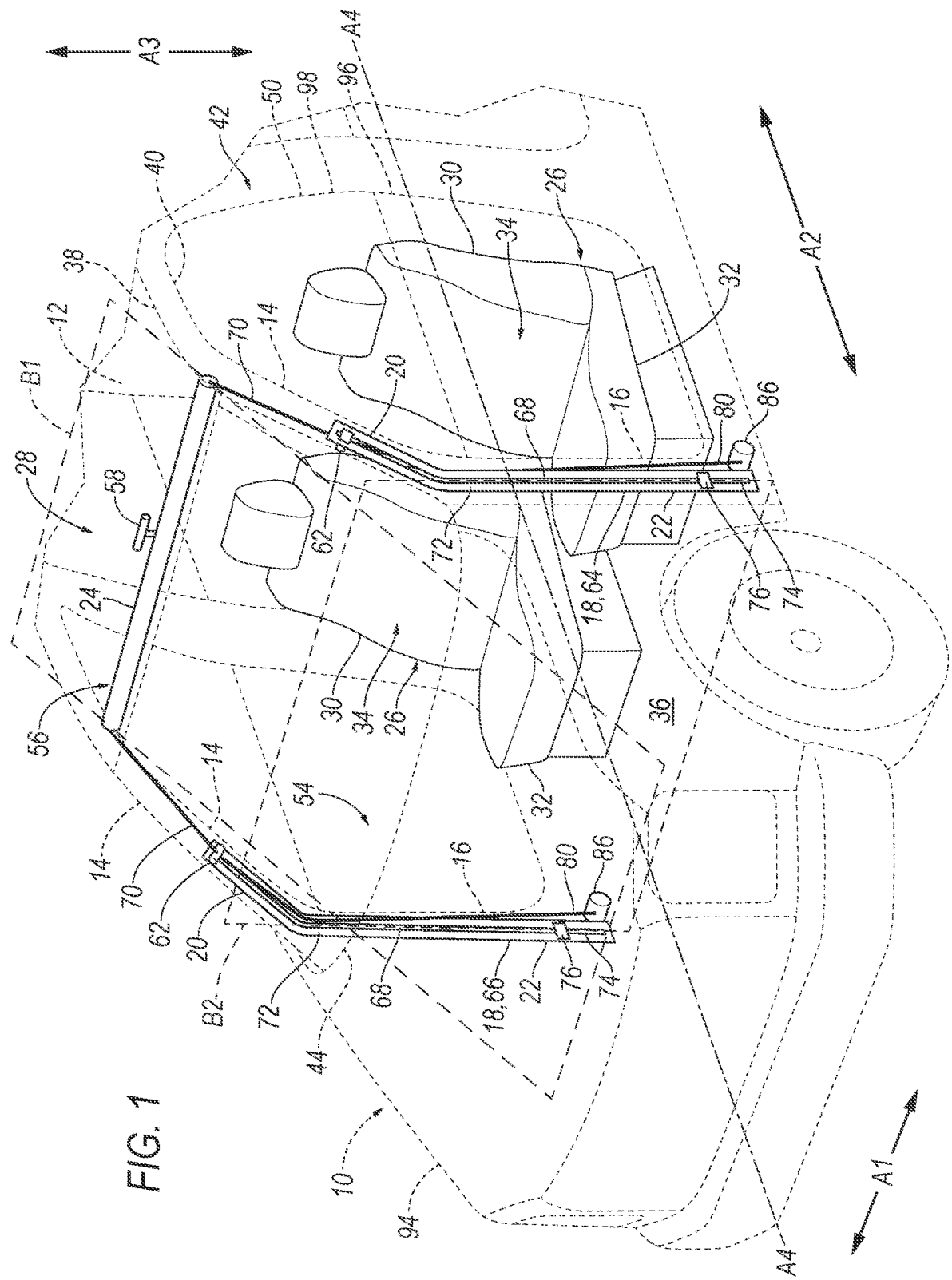
FIG. 1 is a perspective view of a vehicle having an example airbag in the uninflated position.

A vehicle includes a vehicle roof. The vehicle includes a front pillar extending downwardly from the vehicle roof. The vehicle includes a hinge pillar extending downwardly from the front pillar. The vehicle includes a track having a first portion having a first axis elongated along the front pillar. The track includes a second portion having a second axis elongated along the hinge pillar. The second axis is transverse to the first axis. The vehicle includes an airbag supported by the vehicle roof and slidably engaged with the track. The airbag is inflatable to an inflated position. The airbag is engaged to the first portion of the track and the second portion of the track in the inflated position.

The track may include a channel and the airbag may be slideably engaged with the channel. The channel may extend continuously along the first portion of the track and the second portion of the track. The vehicle may include a carrier slidably engaged with the channel. The airbag may be connected to the carrier. The vehicle may include a tether retractor fixed relative to the track. The tether retractor may be operatively connected to the carrier to pull the carrier downwardly along the track. The tether retractor may include a pyrotechnic charge. The vehicle may include a tether retractor fixed relative to the track and a tether extending from the tether retractor to the carrier. The vehicle may include a tether extending from the airbag to the carrier.

The airbag may be adjacent the front pillar and the hinge pillar in the inflated position.

The vehicle may include a windshield at the front pillar and a dash at the hinge pillar. the airbag in the deployed position may extend across the windshield and the dash. The airbag may include a first portion elongated along the windshield and a second portion elongated along the dash. The first portion may extend upwardly from the second portion toward the vehicle roof at an angle relative to the second portion.

The vehicle may include an inflator supported by the vehicle roof.

The vehicle may include a second front pillar extending downwardly from the vehicle roof. The vehicle may include a second hinge pillar extending downwardly from the second front pillar. The vehicle may include a second track having a first portion having a first axis elongated along the second front pillar. The second track may include a second portion having a second axis elongated along the second hinge pillar. The second axis of the second track may be transverse to the first axis of the second track. The airbag may extend from the track to the second track in the inflated position. The vehicle may include a second airbag supported by the vehicle roof and slidably engaged with the second track. The second airbag may be inflatable to an inflated position. The second airbag may be engaged to the first portion of the second track and the second portion of the second track in the inflated position. The vehicle may include an uninflatable panel between the airbag and the second airbag. The airbag and the second airbag may abut each other at a cross-vehicle midline. The vehicle may include an inflator. The inflator may be fluidly connected to the airbag and the second airbag.

The first portion of the track may be joined to the second portion of the track. The first portion may be elongated upwardly from the second portion, and the second portion may be elongated downwardly from the first portion.

With reference to the Figures, wherein like numerals indicate like parts throughout the several views, a vehicle 10 includes a vehicle roof 12. The vehicle 10 includes a front pillar 14 extending downwardly from the vehicle roof 12. The vehicle 10 includes a hinge pillar 16 extending downwardly from the front pillar 14. The vehicle 10 includes a track 18 having a first portion 20 having a first axis C1 elongated along the front pillar 14. The track 18 includes a second portion 22 having a second axis C2 elongated along the hinge pillar 16. The second axis C2 is transverse to the first axis C1. The vehicle 10 includes an airbag 24 supported by the vehicle roof 12 and slidably engaged with the track 18. The airbag 24 is inflatable to an inflated position. The airbag 24 is engaged to the first portion 20 of the track 18 and the second portion 22 of the track 18 in the inflated position.

The airbag 24 being deployable along the front pillar 14 and hinge pillar 16 allows for the airbag 24 to deploy in front of front row occupants along the profile of the front pillar 14 and hinge pillar 16. The airbag 24 deploys along the front pillar 14 and travels downwardly to a position vehicle-forward of knees of vehicle 10 occupants, e.g., occupants of a front row of seats 26 as described further below. The track 18 guides the airbag 24 along the first portion 20 and the second portion 22 as the airbag 24 moves to the inflated position. The airbag 24 being supported by the vehicle roof 12 alleviates packaging constraints and accommodates the operation of the airbag 24 to control kinematics of occupants of the front row of seats 26 during certain vehicle impacts.

Figure 5:
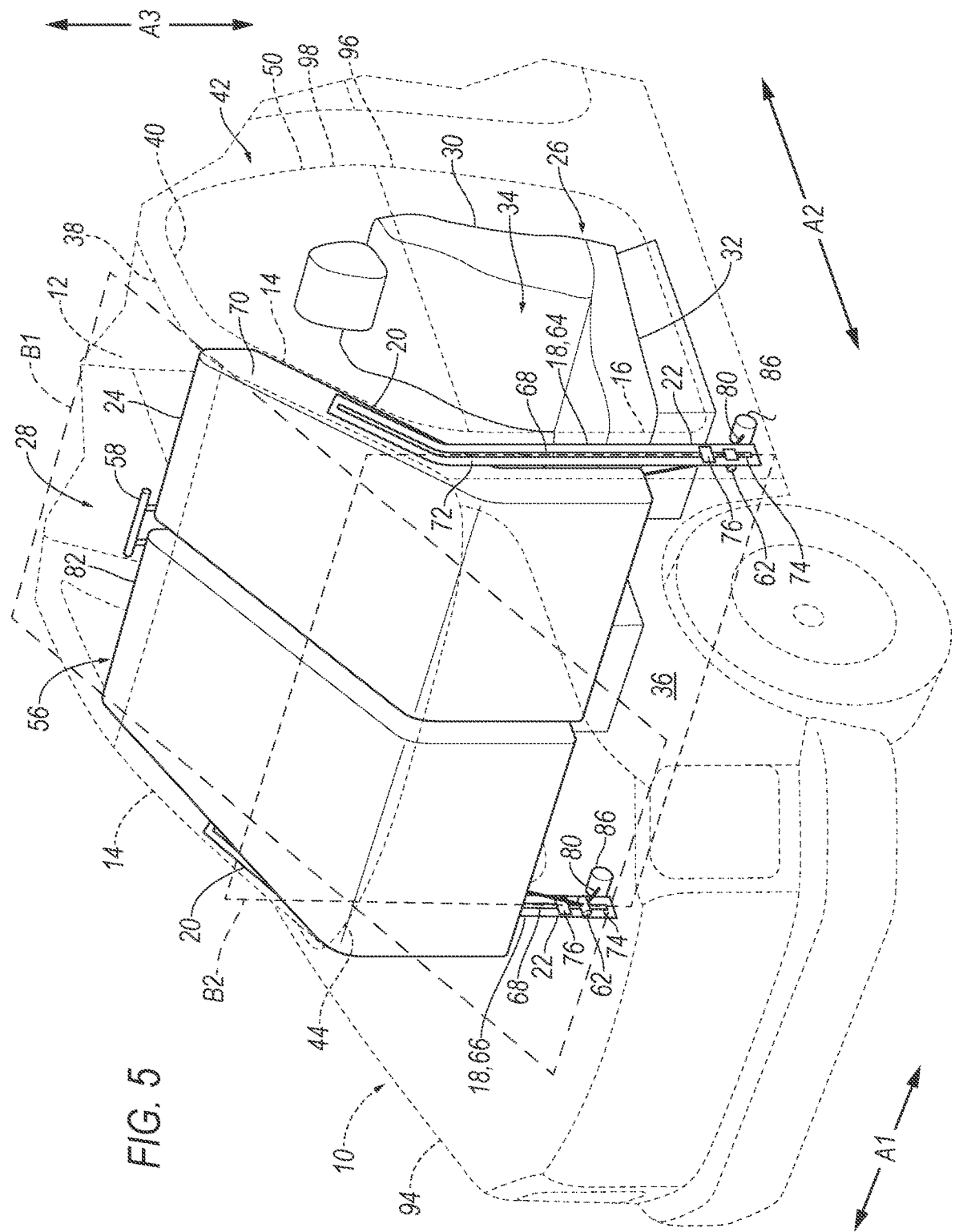
FIG. 5 is a perspective view of the vehicle having an example first airbag and second airbag in an uninflated position.
Figure 6:
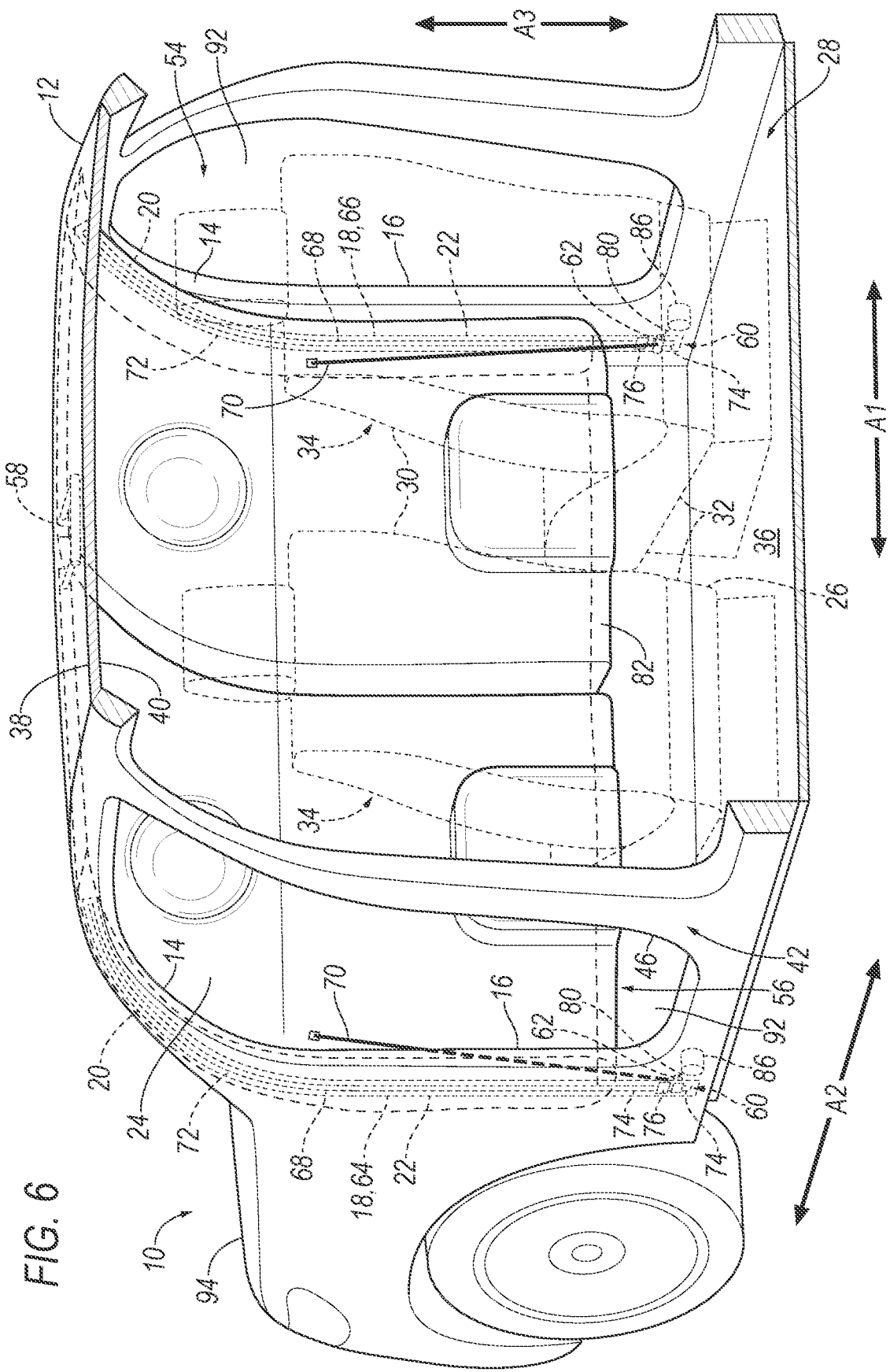
FIG. 6 is a perspective view of FIG. 4 with the first airbag and the second airbag in an inflated position.
Figure 7:
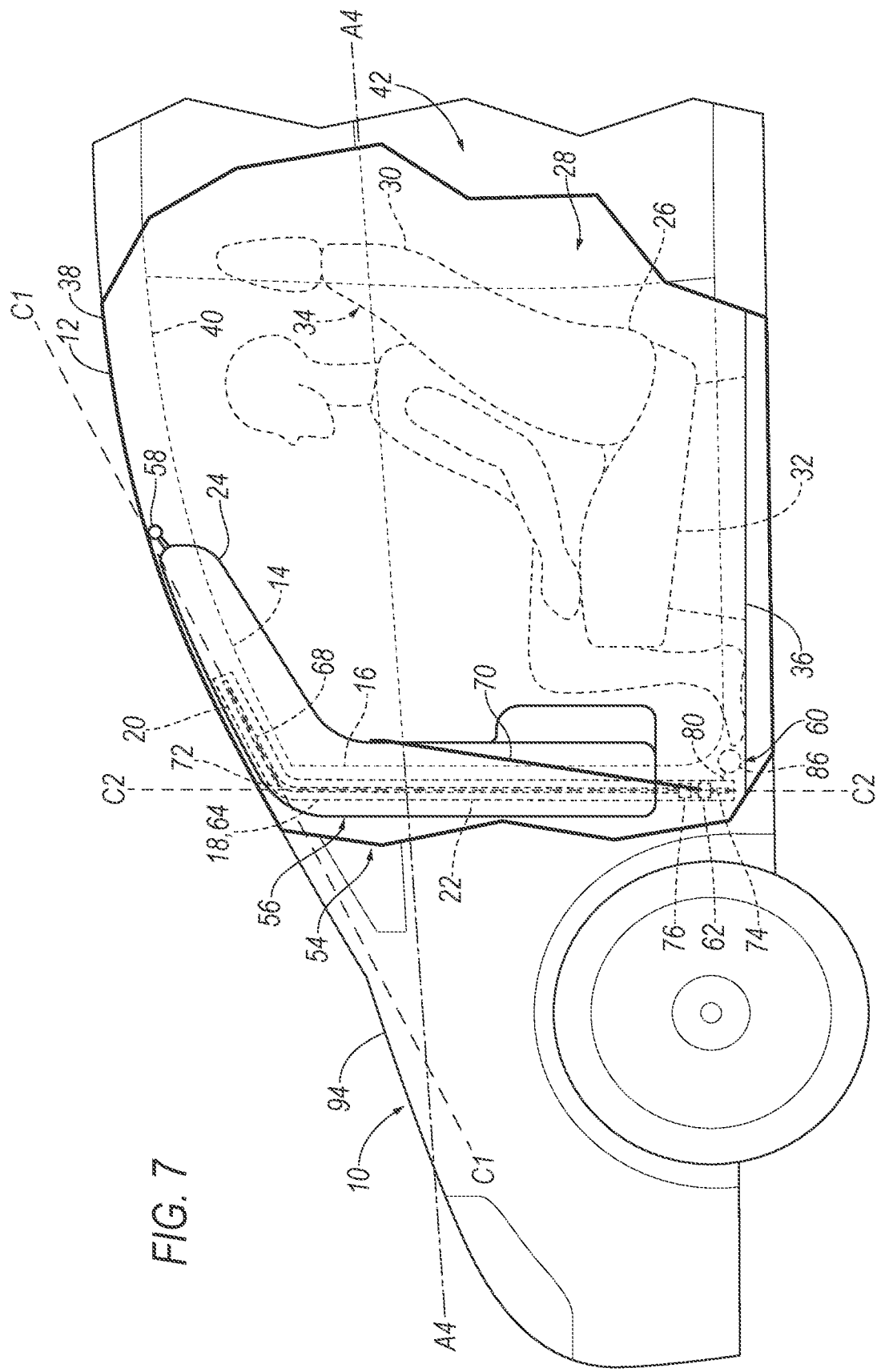
FIG. 7 is a cut-away view of the vehicle with the first airbag and the second airbag of FIG. 4 in the inflated position.

One example of the airbag 24 is shown in the example in FIGS. 1-4. In that example, the airbag 24 extends cross-vehicle from one side of a passenger compartment 28 to another side of the passenger compartment 28. Another example of the airbag 24 is shown in FIGS. 5-7. In that example, two airbags 24, 82 are disposed side-by-side.

Common numerals are used to identify common features in the example shown in FIGS. 1-4 and the example shown in FIGS. 5-7.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

The vehicle 10 defines a longitudinal axis A2, i.e., extending between a front and a rear of the vehicle 10. The vehicle 10 defines a cross-vehicle axis A1, i.e., extending between a right side and a left side of the vehicle 10. The vehicle 10 defines a vertical axis A3, i.e., extending between a top and a bottom of the vehicle 10. The longitudinal axis A2, the cross-vehicle axis A1, and the vertical axis A3 are perpendicular to each other.

The vehicle 10 includes a vehicle body 94. The vehicle body 94 may be of a unibody construction, a body-on-frame construction, or any suitable construction. In the unibody construction, the vehicle body 94 serves as a frame, and the vehicle body 94 (includes the rockers, pillars 14, 16, roof rails, etc.) is unitary as understood in the art with reference to unibody construction of the vehicle body 94. As another example, in body-on-frame construction (also referred to as a cab-on-frame construction), the vehicle body 94 and frame are separate components, i.e., are modular, and the vehicle body 94 is supported on and affixed to the frame. In other examples, the vehicle body 94 may have any suitable construction. The vehicle body 94 may be of any suitable material, for example, steel, aluminum, etc.

The vehicle body 94 may define the passenger compartment 28 to house occupants, if any, of the vehicle 10. The passenger compartment 28 may extend across the vehicle 10, i.e., from one side to the other side of the vehicle 10. The passenger compartment 28 includes a front end (not numbered) and a rear end (not numbered) with the front end being in front of the rear end during forward movement of the vehicle 10.

The vehicle 10 includes at least one seat 26 in the passenger compartment 28. The seats 26 shown in the example in the Figures are bucket seats 26, but alternatively the seat 26 may be a bench seat 26 or another type of seat 26. The seat 26 may include a seat back 30 and a seat bottom 32. The seat back 30 may be supported by the seat bottom 32 and may be stationary or movable relative to the seat bottom 32. The seat back 30 and seat bottom 32 may define an occupant seating area 34. The occupant seating area 34 supports an occupant of the seat 26.

The vehicle body 94 includes a vehicle floor 36 and the vehicle roof 12. The vehicle roof 12 may define the upper boundary of the passenger compartment 28 and may extend from the front end of the passenger compartment 28 to the rear end of the passenger compartment 28. The vehicle floor 36 is below from the vehicle roof 12. The vehicle floor 36 may define the lower boundary of the passenger compartment 28 and may extend from the front end of the passenger compartment 28 to the rear end of the passenger compartment 28.

The vehicle roof 12 provides cover for occupants for the vehicle 10. The vehicle roof 12 may include cross-beams (not numbered), an exterior panel 38, and a headliner 40, shown in FIG. 3. The cross-beams support the exterior panel 38, the headliner 40, etc. The cross-beams may be steel, aluminum, carbon fiber, or any other suitable material. The cross-beams may be elongated along the cross-vehicle axis A1. The headliner 40 and the exterior panel 38 provide class-A surfaces to the vehicle roof 12, i.e., surfaces specifically manufactured to have a high-quality, finished aesthetic appearance free of blemishes, etc.

The headliner 40 may include a tear seam (not numbered). The tear seam is positioned to be broken by the airbag 24 when the airbag 24 inflates. For example, the tear seam may be adjacent the airbag 24 in the uninflated position. The tear seam is designed to rupture upon inflation of the airbag 24. The tear seam may be weaker than a portion of the headliner 40 adjacent the tear seam, e.g., the tear seam may be thinner, a weaker material, etc. The tear seam may connect panels of the headliner 40, e.g., with breakaway stitches. The tear seam may extend along the cross-vehicle axis A1.

The vehicle body 94 includes a body side 42. Specifically, the vehicle body 94 includes two body sides 42 spaced cross vehicle 10 from each other. The body side 42 is a side of the body located vehicle-outboard of the passenger compartment 28. The body side 42 may be spaced cross-vehicle from the longitudinal axis A2 of the vehicle 10 and may be elongated along the longitudinal axis A2. The body side 42 includes one or more door openings 92. The vehicle floor 36 extends from one body side 42 to the other body side 42 and the vehicle roof 12 extends from one body side 42 to the other body side 42.

The vehicle body 94, specifically each body side 42, may include a plurality of pillars 14 and hinge pillars 16. At least some of the pillars 14 extend upwardly from one of the hinge pillars 16, respectively. Specifically, the hinge pillar 16 rotatably supports a vehicle door 46, described further below. In such examples, the door 46 is connected to the hinge pillar 16 with a hinge (not shown) that allows the door 46 to rotate relative to the hinge pillar 16 for occupant ingress and egress. For example, the pillar 14 may extend between a windshield 44 and a front door 46 and another pillar may be behind the front doors 46. The vehicle 10 may include any suitable number of pillars 14, 16, on either body side 42.

The vehicle 10 includes vehicle doors 46 openable for occupants to enter and exit the passenger compartment 28. In the example shown in the Figures, the vehicle 10 includes a front door 46 and a rear door 46 on each body side 42. The front door 46 is vehicle-forward of the rear door 46 along the longitudinal axis A2 of the vehicle 10. Each door 46 includes at least one door panel (not numbered) and the door-trim panel (not numbered) supported on the door panel. Specifically, the door 46 may include two panels, namely a door inner (not numbered) and a door outer (not numbered). In such an example, the door-trim panel and the door outer are fixed to the door inner. The door-trim panel is positioned opposite the door outer. The door-trim panel is inboard relative to the door inner, and the door outer is outboard relative to the door inner. The door 46 includes a window opening 48 that may be completely closed by a window 50 of the window 50 is in a fully raised position. The door outer faces outboard relative to the vehicle 10. The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.). The door inner may be metal (such as steel, aluminum, etc.) or polymeric (such as fiber reinforced plastic composite, etc.). The door inner provides structural rigidity for the door outer. The door inner may provide a mounting location for components of the door 46. The door-trim panel may include a covering. The covering may include upholstery, padding, etc. The upholstery may be cloth, leather, faux leather, or any other suitable material. The padding may be foam or any other suitable material. The door-trim panel may be a material suitable for an interior of the vehicle 10, such as vinyl, plastic, leather, wood, etc.

The pillar 14 and corresponding hinge pillar 16 are elongated generally vertically, e.g., between the bottom and the top of the vehicle 10. In the example shown in the Figures, the pillars 14 extend downwardly from the vehicle roof 12. Specifically, the front pillar 14 extends downwardly from the vehicle roof 12 and the hinge pillar 16 extends downwardly from the front pillar 14. In the example shown in the Figures, the hinge pillar 16 extends from the front pillar 14 to the vehicle floor 36. The pillars 14, 16 provide structural rigidity to the vehicle 10 and support other components of the vehicle 10. In other words, the front pillars 14 support the vehicle roof 12 at the front of the passenger compartment 28. In the example shown in the Figures, the vehicle roof 12, the front pillar 14, the corresponding hinge pillar 16, and the vehicle floor 36 are irremovably fixed to the each other, i.e., secured to each other in such a way that removal requires destruction such as cutting, e.g., cutting material and/or welded joints, etc. As an example, the vehicle roof 12, the front pillar 14, the corresponding hinge pillar 16, and the vehicle floor 36 may be attached to each other by unitary formation and/or by welding. As an example, the pillar 14 and the hinge pillar 16 may be unitary, i.e., a single, uniform piece of material with no seams, joints, fasteners, or adhesives holding it together, i.e., formed together simultaneously as a single continuous unit, e.g., by stamping, machining from a unitary blank, molding, forging, casting, etc. Non-unitary components, in contrast, are formed separately and subsequently assembled, e.g., by threaded engagement, welding, etc.

The vehicle 10 includes two front pillars 14 and associated hinge pillars 16 spaced cross-vehicle. The windshield 44 is at the front pillars 14. The windshield 44 prevents objects from entering the passenger compartment 28 of the vehicle 10, e.g., rain, bugs, etc. The windshield 44 is transparent, e.g., to permit the occupants to see therethrough. The windshield 44 may be formed of any suitable material, e.g., glass, plastic, laminate, etc. The windshield 44 may extend from one front pillar 14 to the other front pillar 14. The windshield 44 may extend from a dash 52 to the vehicle roof 12. The windshield 44 may be secured to the front pillars 14, e.g., with an adhesive.

The hinge pillar 16 is located at the door opening 92, as described above. The hinge pillar 16 may support the door 46 at the door opening 92. The hinge pillar 16 and the front pillar 14 may be of any suitable material, for example, steel, aluminum, etc.

The dash 52 is at the hinge pillar 16. In the example shown in the Figures, the dash 52 is disposed at a forward end 54 of the passenger compartment 28 and faces toward the seats 26. Specifically, the dash 52 may extend from one of hinge pillars 16 cross-vehicle to the other of the hinge pillars 16. In other words, the dash 52 may extend completely across the front end of the passenger compartment 28. The dash 52 may extend from the vehicle floor 36 to the windshield 44. The dash 52 may include an instrument panel that includes one or more instruments such as gauges, displays, a user interface, etc. The instrument panel may be elongated along the cross-vehicle axis A1. The user interface presents information to and receives information from an occupant of the vehicle 10. The user interface may include dials, digital readouts, screens such as a touch-sensitive display screen, speakers, buttons, knobs, keypads, microphone, and so on for providing information to, and receiving information from, the occupant.

Figure 2:
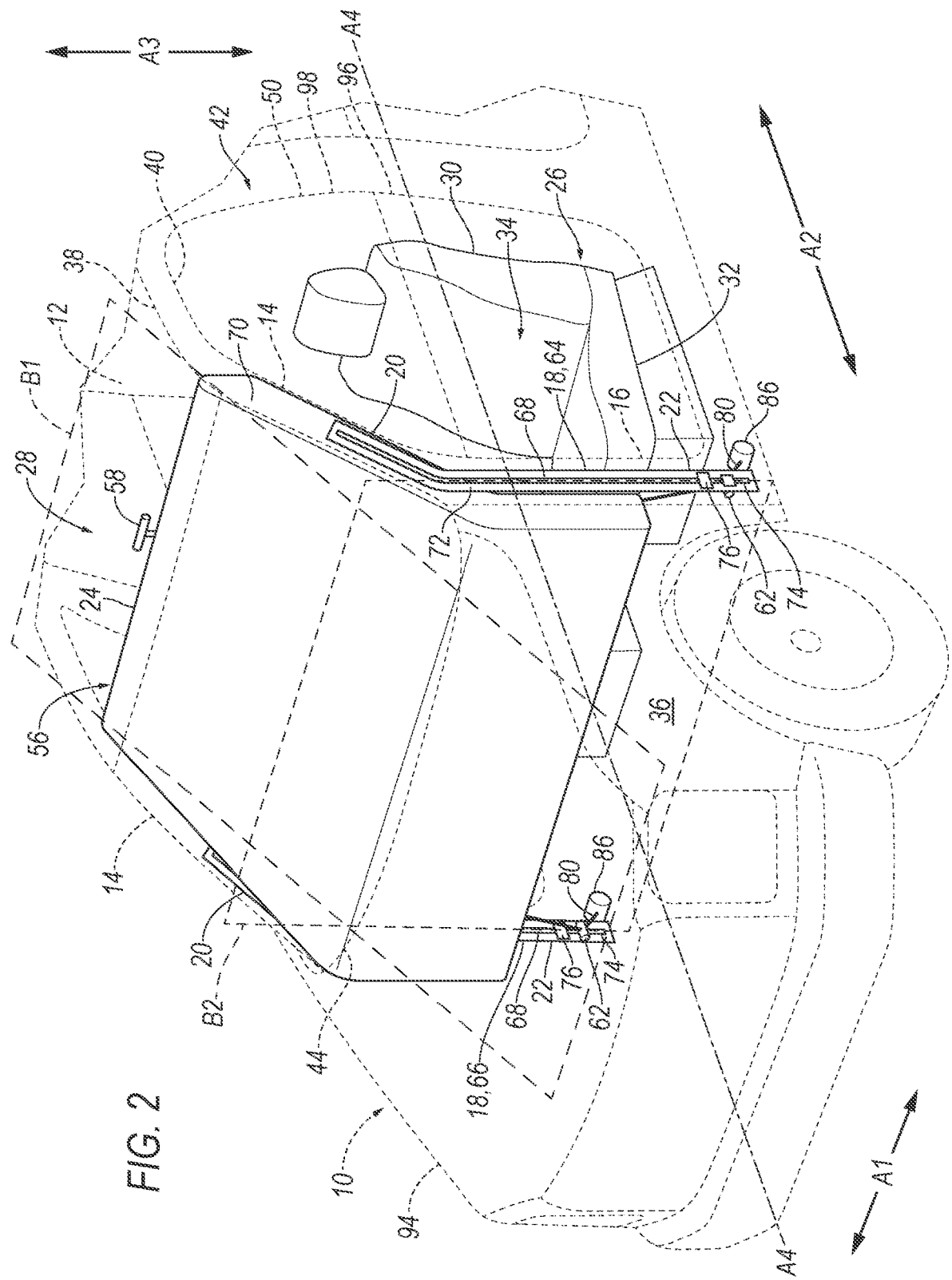
FIG. 2 is a perspective view of FIG. 1 with the airbag in an inflated position.
Figure 3:
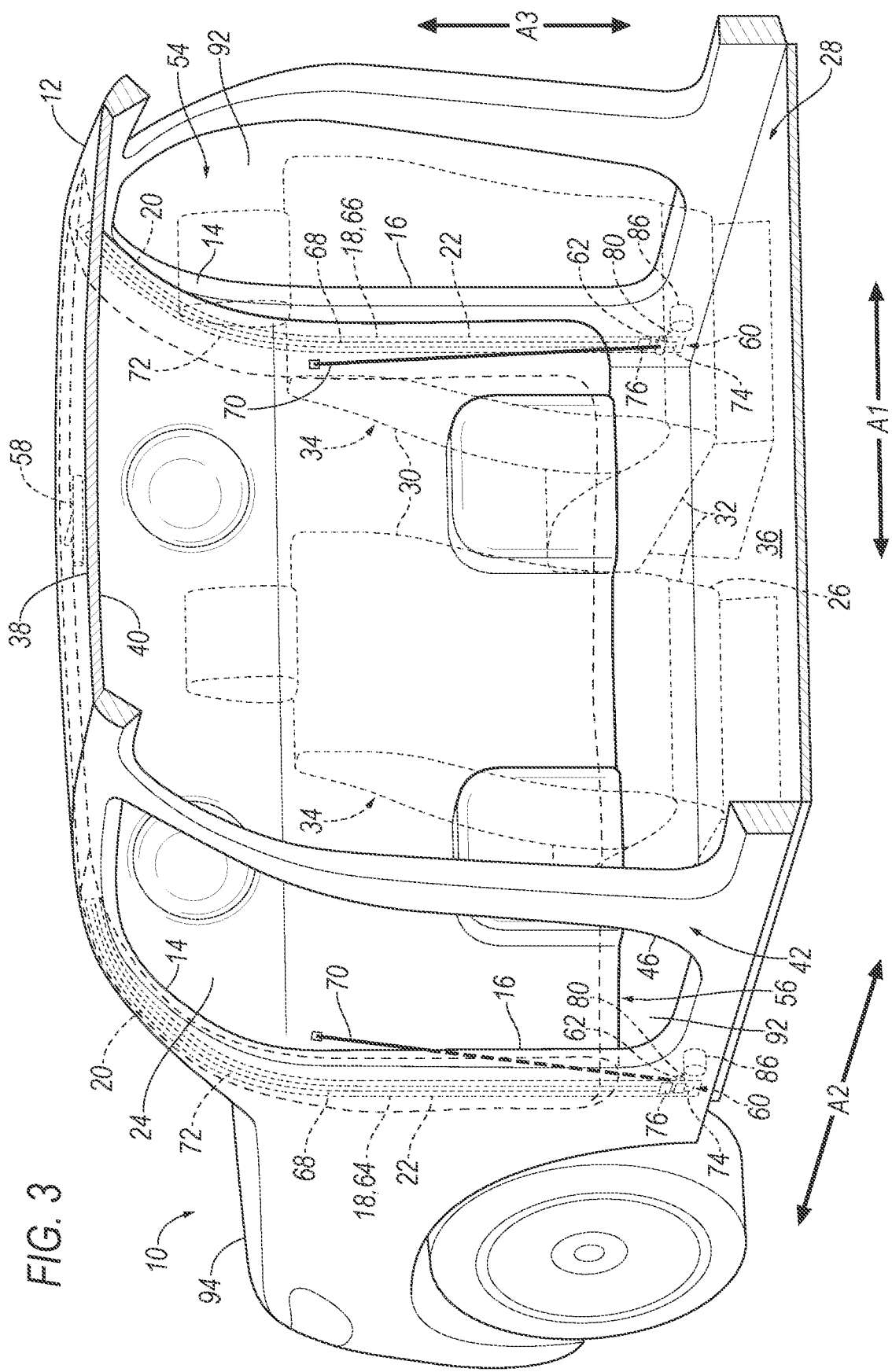
FIG. 3 is cut-away view of the vehicle with the airbag of FIG. 1 in the inflated position.
Figure 4:
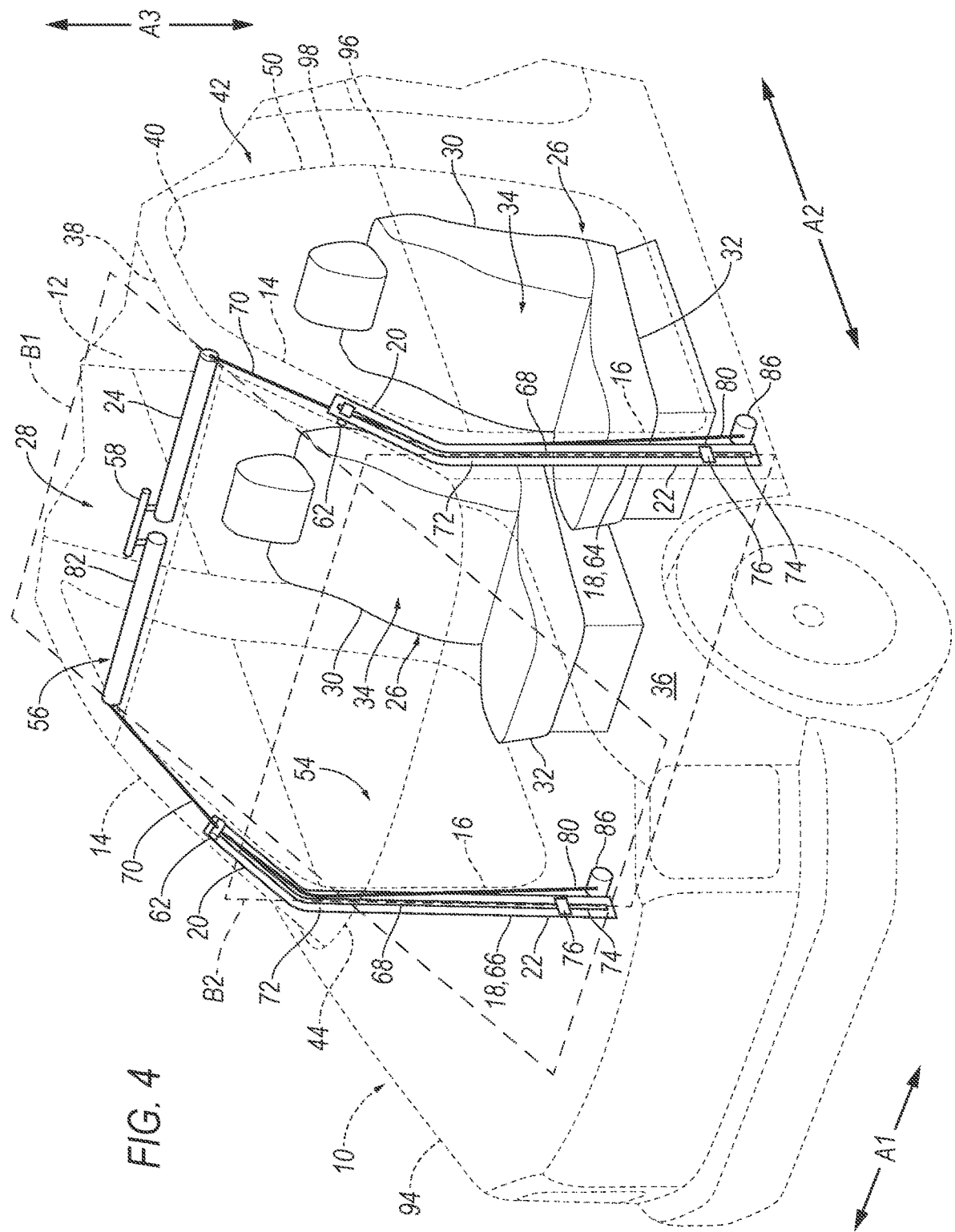
FIG. 4 is a side view of the vehicle with the airbag of FIG. 1 in the inflated position.

The vehicle 10 includes an airbag deployment assembly 60 including the track 18 and a carrier 62. The airbag deployment assembly 60 may include at least one tether retractor 86, e.g., a pyrotechnic retractor, that moves the carrier 62 from a raised position, as shown in FIG. 1, to a lowered position, as shown in FIG. 2. As set forth below, the carrier 62 is connected to at least one airbag 24 such that the carrier 62 pulls at least one airbag 24 downwardly from an undeployed position of the carrier 62 to a deployed position of the carrier 62. In some examples, the airbag deployment assembly 60 may include two tracks 18, namely a first track 18, 64 and a second track 18, 66.

As set forth above, the vehicle 10 includes one or more tracks 18 to guide movement of the airbag 24 as the airbag 24 inflates and controls kinematics of the occupants during certain vehicle impacts. Specifically, the vehicle 10 may include a pair of tracks 18, namely the first track 18, 64 and the second track 18, 66. The first track 18, 64 is spaced from the second track 18, 66 cross-vehicle, i.e., along the cross-vehicle axis A1. Each track 18 is elongated between distal ends.

The tracks 18 may be fixed relative to the dash 52, e.g., via fastener, weld, etc. For example, and with reference to FIGS. 1-3, the tracks 18 may be fixed to the pillars 14, 16, e.g., to the front pillar 14 and/or the hinge pillar 16. The instrument panel may be between the vehicle roof 12 and one of the tracks 18, relative to the vertical axis A3.

The track 18 includes the first portion 20 having the first axis C1 elongated along the front pillar 14 and the second portion 22 having the second axis C2 elongated along the hinge pillar 16. Specifically, the first portion 20 of the track 18 may extend continuously along the first axis C1 and the second portion 22 of the track 18 may extend continuously along the second axis C2. In the example shown in FIGS. 1-7, the second portion 22 may be closer to the vehicle floor 36 than the first portion 20 relative to the vertical axis.

The first portion 20 is elongated upwardly from the second portion 22, and the second portion 22 is elongated downwardly from the first portion 20. With continued reference to FIGS. 1-7, the first axis C1 may be transverse, i.e., at a suitable angle, to the second axis C2. Specifically, the first axis C1 crosses the path of the second axis C2. In other words, the first portion 20 of the track 18 may be transverse to the second portion 22 of the track 18. The second axis C2 is upright, specifically, between 60-100 degrees relative to horizontal. For example, the second axis C2, in some examples may be vertical. The second portion 22 is elongated upright, e.g., vertical, and extends upwardly from one of the distal ends to the first portion 20, and the first portion 20 is elongated vehicle-rearward from the second portion to the other of the distal ends. The angle between the first axis C1 and the second axis C2 may be any suitable angle and may be, for example, dependent on external styling or performance factors of the vehicle design.

The first portion 20 of the track 18 may be joined to the second portion 22 of the track 18. Specifically, since the first portion 20 of the track 18 and the second portion 22 of the track 18 may be joined at a curved path 72 of the track 18. In other words, the first portion 20 of the track 18 and the second portion 22 of the track 18 may be unitary, i.e., a single, uniform piece of material.

Each track 18 may define a channel 68 extending along the track 18. Specifically, the channel 68 may extend continuously along the first portion 20 of the track 18 and the second portion 22 of the track 18. For example, the channel 68 may be elongated along the curved path 72 of the track 18. The track 18 may permit movement of the airbag 24 along the elongation of the track 18, e.g., along the channel 68 and between the distal ends. The track 18 may restrict movement of the carrier 62 transverse to the elongation of the track 18. In the Figures, each airbag 24 is guided via the track 18, 64 and the second track 18, 66 and first and second carriers 62. In other examples, a single track 18 and carrier 62 may be used. The adjectives "first" and "second" are used throughout this document as identifiers and are not intended to signify importance or order.

The airbag 24 is slidably engaged with the track 18. Specifically, the airbag 24 may be slideably engaged with the channel 68, e.g., the channel 68 guides the inflation of the airbag 24. In examples including more than one airbag 24, and with reference to FIGS. 4-6, the airbag 24 may be engaged with the first portion 20 of the track 18 and the second portion 22 of the track 18 in the inflated position and the second airbag 82 may be engaged the first portion 20 of the second track 18, 66 and the second portion 22 of the second track 18, 66 in the inflated position. In other words, the airbag 24 and the second airbag 82 may be elongated along the first portion 20 and the second portion 22 and along the curve of the track 18. In examples including more than one track 18, one of the tracks 18 may be spaced from another of the tracks 18 along the cross-vehicle axis A1. In other words, one of the tracks 18 may be closer to the right side of the vehicle 10 than another of the tracks 18 relative to the cross-vehicle axis A1. In such an example, the airbag 24 may be slidably engaged with both tracks 18.

The airbag 24 may be connected to the carrier 62. For example, a tether 70 may be fixed to the airbag 24, e.g., via stitching, friction weld, etc., and may be fixed to the carrier 62, e.g., via fastener, loop, etc. Force and motion may be transferred from the carrier 62 to the airbag 24, or vice versa, via the tether 70.

Each carrier 62 may be slidably engaged with the channel 68 between the undeployed position and the deployed position. The carrier 62 is in the undeployed position when the airbag 24 is in the uninflated position. The carrier 62 is in the deployed when the airbag 24 is in the inflated position. The undeployed position is closer to the housing supporting the respective airbag 24 in the undeployed position than in the deployed position. In other words, the carrier 62 may move away from the respective housing when moving from the undeployed position the deployed position.

A stop 74 may be fixed relative to each of the tracks 18 at the deployed position. The stop 74 is a structure that restricts movement of the carrier 62 along the respective track 18. For example, the stop 74 may be fixed within the channel 68 of the track 18 at the deployed position, i.e., such that the carrier 62 in the deployed position abuts the stop 74.

A retainer 76 may be supported relative to each of the tracks 18. The retainer 76 is configured to maintain the respective carrier 62 in the deployed position. The retainer 76 may permit the carrier 62 to slide along the track 18 from the undeployed position to the deployed position and restrict the carrier 62 from sliding from the deployed position to the undeployed position. The retainer 76 may be supported by the track 18, e.g., in the channel 68. For example, the retainer 76 may be a wedge fixed in the channel 68 and having a first surface and a second surface. The first surface may be closer to the housing than the second surface, and the second surface may be closer to the stop 74 than the first surface. In other words, the first surface may be between the housing and the second surface along the track 18, and the second surface may be between the first surface and the stop 74 along the track 18. The first surface may extend at a shallower angle relative to the track 18 than the second surface. For example, the first surface may extend at a less than 45-degree angle relative to elongation of the track 18, and the second surface may extend at a generally 90-degrees relative to elongation the track 18. Normal forces between the first surface and the carrier 62 as the carrier 62 moves to the deployed position may flex the retainer 76, e.g., out of a path of the carrier 62, and/or generally provide insufficient force to restrict moment of the carrier 62. Normal forces between the second surface and the carrier 62 as the carrier 62 is urged away from the deployed position may maintain the carrier 62 in the deployed position. In other words, the first surface and the second surface of the retainer 76 may function as a ratchet tooth. The retainer 76 may include other suitable structure to permit the carrier 62 to slide to the deployed position and to maintain the carrier 62 in the deployed position. In the event of certain vehicle impacts, the tether retractor 86 pulls the tether 80 downwardly as the airbag 24 inflates from the uninflated position to the inflated position. The tether retractor 86 and the tether 80 may assist, for example, with positioning the airbag 24 during certain vehicle impacts to control certain kinematics of occupants of the front seats 26.

As set forth above, the tether retractor 86 may be mounted to the vehicle body 94. The tether 80 is connected to the carrier 62 and the tether retractor 86. Specifically, the tether 80 is operatively connected to the tether retractor 86 so that the tether retractor 86 retracts the tether 80 into the tether retractor 86 to pull the airbag 24 downwardly. The tether retractor 86 is mounted below the seat back 30 of the front seat 26 and the seat back 30 of the rear seat 26 to pull the side airbag 24 downwardly. Specifically, the tether retractor 86 may be mounted below the beltline A4 of the vehicle 10.

The tether retractor 86 may be, for example, fixed relative to the track 18. For example, the tether retractor 86 may be fixed to the track 18, the vehicle floor 36, one of the pillars 14, 16, etc., e.g., proximate the stop 74. The tether retractor 86 may be operatively connected to the carrier 62 such that actuation of the tether retractor 86, e.g., by the controller, pulls the carrier 62 downwardly along the track 18 toward the deployed position. The tether retractor 86 may be operatively connected to the carrier 62 with a tether 80. In the uninflated position, the tether 80 may be disposed along the pillar 14, 16 between the pillar 14, 16 and a trim panel on the pillar 14, 16. In other words, the trim panel may conceal the tether 80 in the uninflated position. During inflation of the airbag 24 and retraction of the tether 80, the tether 80 breaks the trim panel, e.g., by releasing trim panel from the pillar 14, 16, splitting a tear seam on the B-panel, etc.

The tether 70 may extend from the airbag 24 to the carrier 62. In the example in the Figures, the tether 70 may be slidably engaged with the track 18. Specifically, the tether 70 may move the moveable along the track 18 pulled by the carrier 62 pulls the tether 70 along the track 18 toward the vehicle floor 36 in the event of certain vehicle impacts. The tether 70 may be directly or indirectly connected to the airbag 24 and the carrier 62.

The tether retractor 86 may be pyrotechnically activated to pull the airbag 24 downwardly as the airbag 24 inflates to the inflated position. In such an example, the tether retractor 86 includes a pyrotechnic charge in a housing (not numbered). The pyrotechnic charge is activated to retract the tether 80. The pyrotechnic device may be, for example, a rotary retractor. The pyrotechnic charge is combustible to produce a gas, e.g., to retract a piston or turn a wheel, to retract the tether 80 into the housing of the tether retractor 86. The pyrotechnic charge may be a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2). The tether 80 may be cloth, fabric, metal, polymeric, or any suitable type of material. The tether retractor 86 may be in fluid communication with the inflator 58, i.e., the tether retractor 86 may activate simultaneously with the inflator 58.

With reference to the FIGS. 1-7, the vehicle 10 includes an airbag assembly 56 mounted to the vehicle body 94. The airbag assembly 56 includes the airbag 24 and an inflator 58. In some examples, the airbag assembly 56 may include a second airbag 82 and may include a housing (not shown in the example in the Figures). As described further below, the airbag 24 is mounted to the vehicle body 94 above the beltline A4 of the vehicle 10. In the uninflated position, the airbag 24 is above the beltline A4 of the vehicle 10. In the uninflated position, the airbag 24 may be rolled and/or folded on the vehicle body 94, e.g., on the vehicle roof 12. In the undeployed position, the airbag 24 may be elongated along the cross-vehicle axis A1. The airbag 24 is inflatable downwardly between the dash 52 and the respective front seat 26 from the uninflated position to the inflated position. The airbag 24 being above the beltline A4 of the vehicle 10 alleviates packaging constrains and accommodates the operation of the airbag 24. In the event of certain vehicle impacts, the airbag 24 inflates to the inflated position to control certain kinematics of the occupants of the front seat 26.

The airbag 24 is supported by the vehicle roof 12. In other words, the weight of the airbag 24 is supported by the vehicle roof 12 in the uninflated position and the inflated position. Specifically, the airbag 24 may be elongated cross-vehicle and supported relative to the vehicle roof 12, e.g., by the housing. For example, and with reference to FIGS. 1 and 3, the airbag 24 extends from the track 18, 64 to the second track 18, 66 in the uninflated position and in the inflated position. the airbag 24 in the uninflated position and the housing may be elongated along the cross-vehicle axis A1 A2. As shown in the Figures, the airbag 24 in the uninflated position and the housing may be above the headliner 40, e.g., relative to the vertical axis A3. In other words, the airbag 24 in the uninflated position may be between the headliner 40 and the vehicle roof 12 relative to the vertical axis A3.

The airbag 24 is adjacent the front pillar 14 and the hinge pillar 16 in the inflated position. The airbag 24 includes the first portion 20 elongated in a first plane B1 along the windshield 44, i.e., from the hinge pillar 16 on the left side of the vehicle 10 to the hinge pillar 16 on the right side of the vehicle 10, and the second portion 22 elongated in a second plane B2 along the dash 52, i.e., from the front pillar 14 on the left side of the vehicle 10 to the front pillar 14 on the right side of the vehicle 10, the first plane B1 is transverse to the second plane B2. Specifically, as the airbag 24 unfolds and/or unrolls to the inflated position, the airbag 24 may curve from the first plane B1 along the windshield 44 to the second plane B2 along the dash 52. As another example, and with reference to FIG. 2-7, the airbag 24 may define an inflation direction that is downward along the vertical axis A3, e.g., from the vehicle roof 12 and toward the vehicle floor 36 of the vehicle 10 along the vertical axis A3.

The airbag 24 is inflatable to the inflated position, as described above. In the example shown in the Figures, the airbag 24 includes a recess shape above the beltline A4. The recess is designed to receive the head of an occupant during certain vehicle impacts. The airbag 24 may include an extension portion below the beltline A4. The extension is spaced to contact the knee of an occupant during certain vehicle impacts.

The airbag 24 in the deployed position extending across the windshield 44 and the dash 52. Specifically, the airbag 24 includes the first portion 20 elongated along the windshield 44 and the second portion 22 elongated along the dash 52. Since the first portion 20 of the track 18 is transverse to the second portion 22 of the track 18, the first portion 20 of the airbag 24 extending upwardly from the second portion 22 toward the vehicle roof 12 at an angle relative to the second portion 22.

As set forth above, in the example shown in FIGS. 1-4, the airbag 24 extends across the passenger compartment 28 from one of the pillars 14 and corresponding hinge pillars 16 to the other of the pillars 14 and corresponding hinge pillars 16. In such an example, the airbag 24 can control the kinematics of multiple occupants of the front row of seats 26 in certain vehicle impacts.

As another example, as shown for example in FIGS. 5-7, in some examples the vehicle 10 may include more than one airbag 24 disposed cross-vehicle. In examples including two airbags 24, 82, the airbag 24 and the second airbag 82 may abut each other, e.g., at a cross-vehicle midline, as shown in the example shown in the Figures. Specifically, the airbag 24 and the second airbag 82 abut the second airbag 82 may abut when both the airbag 24 and the second airbag 82 are in the inflated position. With reference to FIG. 5-7, the airbag 24 and the second airbag 82 in the inflated position are adjacent the windshield 44 and the dash 52. In other words, the airbag 24 may be elongated along the curved path 72. Alternatively, the airbag assembly 56 may include an uninflatable panel (not shown) between the airbag 24 and the second airbag 82. Specifically, the uninflatable panel may extend from the airbag 24 to the second airbag 82. In such an example, the airbag 24, second airbag 82, and uninflatable panel may be elongated along the curved path 72.

As set forth above, the airbag 24 and the second airbag 82 may be independently inflatable. In other words, the airbag 24 is not in fluid communication with the second airbag 82. The assembly includes at least one inflator 58. In one example, one inflator 58 may be fluidly connected to the airbag 24 and the second airbag 82, e.g., through separate fill tubes. As another example, the airbag assembly 56 may include one inflator 58 in fluid communication with the airbag 24 and another inflator 58 in fluid communication with the second airbag 82.

The airbag 24 may be formed of a woven polymer or any other material. As one example, the airbag 24 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 58 may be supported by vehicle body 94 above the windshield 44. Specifically, the inflator 58 may be directly or indirectly mounted to the vehicle body 94, e.g., with fasteners such as threaded fasteners, push-pins, Christmas-tree fasteners, etc. The inflator 58 may be supported by the vehicle roof 12, as shown in the example in the Figures. As another example, in examples including the housing, the housing may be mounted to the vehicle body 94, e.g., the vehicle roof 12, and the inflator 58 may be supported by and/or mounted to the housing.

The inflator 58 expands the airbag 24 with inflation medium, such as a gas, to move the airbag 24 from the uninflated position to the inflated position. The inflator 58 may be, for example, a pyrotechnic inflator 58 that ignites a chemical reaction to generate the inflation medium, a stored gas inflator 58 that releases (e.g., by a pyrotechnic valve) stored gas as the inflation medium, or a hybrid. The airbag assembly 56 may include any suitable number of inflators 58. In the example shown in the Figures, the airbag assembly 56 includes one inflator 58 to inflate the airbag 24 and the second airbag 82 to the inflated position.

Figure 8:
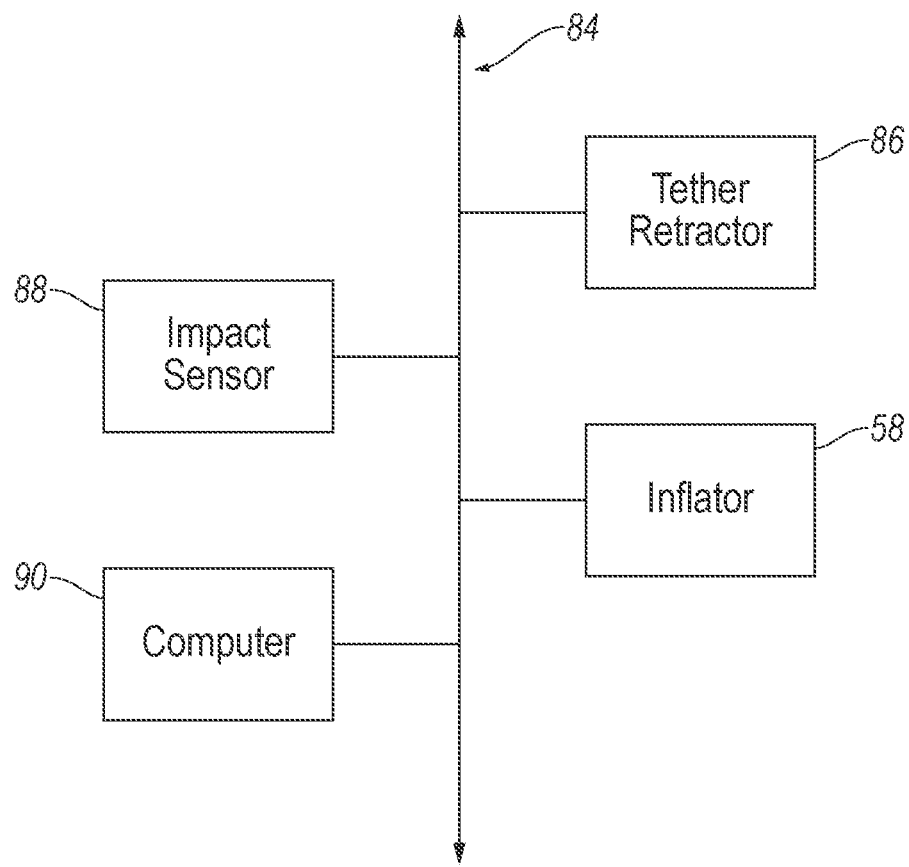
FIG. 8 is a block diagram of a system of the vehicle.

With reference to FIG. 8, the vehicle 10 may include a computer having a processor and a memory storing instructions executable by the processor to deploy the airbag 24. The computer may be, for example, a restraints control module. Use of "in response to," "based on," and "upon determining" herein indicates a causal relationship, not merely a temporal relationship.

The vehicle 10 may include at least one impact sensor 88 for sensing impact of the vehicle 10. The impact sensor 88 is in communication with the computer. The computer may activate the inflator 58, e.g., provide an impulse to a pyrotechnic charge of the inflator 58 when the impact sensor 88 senses an impact of the vehicle 10. Alternatively or additionally to sensing impact, the impact sensor 88 may be configured to sense certain vehicle impacts prior to impact, i.e., pre-impact sensing. The impact sensor 88 is configured to detect certain vehicle impacts to the vehicle 10. The impact sensor 88 may be of any suitable type, for example, post-contact sensors such as accelerometers, pressure sensors, and contact switches; and pre-impact sensors 88 such as radar, LIDAR, and vision-sensing systems. The vision-sensing systems may include one or more cameras, CCD image sensors, CMOS image sensors, etc. The impact sensor 88 may be located at numerous points in or on the vehicle 10.

The computer in FIG. 8 illustrates an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit) ASIC(,an electronic circuit,a processor)shared, dedicated, or group), and/or memory)shared, dedicated, or group (that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

With continued reference to FIG. 8, the vehicle 10 includes a communication network 84 that can include a bus in the vehicle 10 such as a controller area network (CAN) or the like, and/or other wired and/or wireless mechanisms. Via the vehicle network, the computer may transmit messages to various devices in the vehicle 10 and/or receive messages (e.g., CAN messages) from the various devices, e.g., sensors, an actuator, a human machine interface (HMI), etc. Alternatively or additionally, in cases where the computer actually comprises a plurality of devices, the vehicle communication network 84 may be used for communications between devices represented as the computer in this disclosure. Further, as mentioned below, various controllers and/or sensors may provide data to the computer via the vehicle communication network 84.

In the event of certain vehicle impacts, the impact sensor 88 may detect the impact and transmit a signal through the communications network to the vehicle controller. The vehicle 10 controller may transmit a signal through the communications network to the inflator 58 and the tether retractor 86. The inflator 58 may discharge and inflate the airbag 24, and the tether retractor 86 may actuate and urge the carrier 62 toward the deployed position. The carrier 62 may travel along the track 18 to the deployed position abutting the stop 74, and the retainer 76 may maintain the carrier 62 in the deployed position. The airbag 24 in the inflated position may control certain kinematics of an occupant, in the passenger compartment 28, and the carrier 62 may control kinematics of the airbag 24 in the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle roof;
   a vehicle body defining a beltline;
   a front pillar extending downwardly from the vehicle roof;
   a hinge pillar extending downwardly from the front pillar;
   a track having a first portion having a first axis elongated along the front pillar;
   the track including a second portion having a second axis elongated along the hinge pillar, the second axis being transverse to the first axis;
   an airbag inflatable from an uninflated position to an inflated position, the airbag being supported by the vehicle roof in the uninflated position and the inflated position and slidably engaged with the track;
   a carrier slidably engaged with the track;
   a tether retractor mounted to the vehicle body below the beltline;
   a first tether extending from the carrier to the airbag; and
   a second tether extending from the tether retractor to the carrier, the second tether being operatively coupled to the tether retractor so that the tether retractor retracts the tether into the tether retractor to pull the airbag downwardly;
   in the inflated position, the carrier being below the beltline and the first tether being connected to the airbag above the beltline.

2. The vehicle of claim 1, wherein the track includes a channel and the airbag is slideably engaged with the channel, the channel extending continuously along the first portion of the track and the second portion of the track.

3. The vehicle of claim 2, wherein the carrier is slidably engaged with the channel, the airbag being connected to the carrier.

4. The vehicle of claim 1, wherein the tether retractor includes a pyrotechnic charge.

5. The vehicle of claim 1, wherein the airbag is adjacent the front pillar and the hinge pillar in the inflated position.

6. The vehicle of claim 1, further comprising a windshield at the front pillar and a dash at the hinge pillar, the airbag in the inflated position extending across the windshield and the dash.

7. The vehicle of claim 6, wherein the airbag includes a first portion elongated along the windshield and a second portion elongated along the dash, the first portion of the airbag extending upwardly from the second portion of the airbag toward the vehicle roof at an angle relative to the second portion of the airbag.

8. The vehicle of claim 1, further comprising an inflator supported by the vehicle roof.

9. The vehicle of claim 1, further comprising:
a second front pillar extending downwardly from the vehicle roof;
a second hinge pillar extending downwardly from the second front pillar;
a second track having a first portion having a first axis elongated along the second front pillar;
the second track including a second portion having a second axis elongated along the second hinge pillar, the second axis of the second track being transverse to the first axis of the second track.

10. The vehicle of claim 9, wherein the airbag extends from the track to the second track in the inflated position.

11. The vehicle of claim 9, further comprising a second airbag supported by the vehicle roof and slidably engaged with the second track.

12. The vehicle of claim 11, further comprising an uninflatable panel between the airbag and the second airbag.

13. The vehicle of claim 11, wherein the airbag and second airbag abut each other at a cross-vehicle midline.

14. The vehicle of claim 11, further comprising an inflator, the inflator being fluidly connected to the airbag and the second airbag.

15. The vehicle of claim 1, wherein the first portion of the track is joined to the second portion of the track, the first portion elongated upwardly from the second portion, and the second portion being elongated downwardly from the first portion.

16. The vehicle of claim 1, wherein the first tether is connected to a vehicle-rearward face of the airbag at a location vehicle-inboard of the hinge pillar when the airbag is the inflated position.

17. A vehicle comprising:
a vehicle roof;
a first front pillar extending downwardly from the vehicle roof;
a first hinge pillar extending downwardly from the first front pillar;
a first track having a first portion having a first axis elongated along the first front pillar;
the first track including a second portion having a second axis elongated along the first hinge pillar, the second axis of the first track being transverse to the first axis of the first track;
a second front pillar extending downwardly from the vehicle roof;
a second hinge pillar extending downwardly from the second front pillar;
a second track having a first portion having a first axis elongated along the second front pillar;
the second track including a second portion having a second axis elongated along the second hinge pillar, the second axis of the second track being transverse to the first axis of the second track;
a first airbag inflatable from an uninflated position to an inflated position, the first airbag being supported by the vehicle roof in the uninflated position and the inflated position and slidably engaged with the first track;
a second airbag supported by the vehicle roof and slidably engaged with the second track; and
an uninflatable panel between the first airbag and the second airbag.

* * * * *